(12) United States Patent
Chang et al.

(10) Patent No.: US 12,062,213 B2
(45) Date of Patent: Aug. 13, 2024

(54) METHOD AND APPARATUS FOR PERFORMING IMAGE COLOR CORRECTION ACCORDING TO IMAGE CONTENT ANALYSIS

(71) Applicant: MEDIATEK INC., Hsin-Chu (TW)

(72) Inventors: Chih-Kai Chang, Hsinchu (TW); Shuo-Li Shih, Hsinchu (TW); Tsu-Ming Liu, Hsinchu (TW); Yung-Chang Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 524 days.

(21) Appl. No.: 17/393,368

(22) Filed: Aug. 3, 2021

(65) Prior Publication Data

US 2022/0245861 A1 Aug. 4, 2022

Related U.S. Application Data

(60) Provisional application No. 63/145,551, filed on Feb. 4, 2021.

(51) Int. Cl.
*G06T 7/90* (2017.01)

(52) U.S. Cl.
CPC ...... *G06T 7/90* (2017.01); *G06T 2207/10024* (2013.01); *G06T 2207/20081* (2013.01); *G06T 2207/20084* (2013.01)

(58) Field of Classification Search
CPC ............ G06T 7/90; G06T 2207/10024; G06T 2207/20081; G06T 2207/20084
USPC ....................................................... 382/167
See application file for complete search history.

(56) References Cited

U.S. PATENT DOCUMENTS 10,482,843 B2 * 11/2019 Guest ....................... G09G 5/14
11,885,970 B2 * 1/2024 Wright ............... G02B 27/0172

FOREIGN PATENT DOCUMENTS

| CN | 110012278 | A |   | 7/2019 |            |
|----|-----------|---|---|--------|------------|
| CN | 110012278 | B | * | 7/2020 | H04N 21/44 |
| TW | 201735630 | A |   | 10/2017 |           |

* cited by examiner

*Primary Examiner* — Jonathan S Lee
(74) *Attorney, Agent, or Firm* — Winston Hsu

(57) ABSTRACT

An image processing method includes: performing content analysis upon an input frame to generate at least one content analysis result of the input frame; determining, by a processing circuit, an anti-blue light strength level for the input frame according to content analysis result(s) of the input frame; and in response to the anti-blue light strength level determined for the input frame, performing color correction upon the input frame to generate an output frame.

21 Claims, 9 Drawing Sheets

METHOD AND APPARATUS FOR PERFORMING IMAGE COLOR CORRECTION ACCORDING TO IMAGE CONTENT ANALYSIS

CROSS REFERENCE TO RELATED APPLICATIONS

This application claims the benefit of U.S. provisional application No. 63/145,551, filed on Feb. 4, 2021 and incorporated herein by reference.

BACKGROUND

The present invention relates to a blue light filtering design, and more particularly, to a method and apparatus for applying color correction to an input frame according to an anti-blue light strength level derived from content analysis of the input frame.

Electromagnetic waves can be divided into ultraviolet light (wavelengths between 10 nm and 400 nm), visible light (wavelengths between 400 nm and 700 nm) and infrared light (wavelengths between 700 nm and 1000 nm). The wavelength range between 415 nm-455 nm has short wavelengths, high energy, and good penetration to the human eye structure. In other words, the human eye structure suffers from the blue light hazard when the blue light with wavelengths between 415 nm-455 nm directly irradiate the retina. People operating more fancy and modern electronic products from day to day than before are exposed to the blue light emitted from electronic products. As a result, the long-term accumulation of the blue light causes eye fatigue, dryness, decreased visual acuity, etc.

The conventional blue light filtering design adopts a fixed anti-blue light strength level for all frames and introduces significant color shift. Thus, there is a need for an innovative blue light filtering design capable of addressing the blue light hazard issue with fewer side effects.

SUMMARY

One of the objectives of the claimed invention is to provide a method and apparatus for applying color correction to an input frame according to an anti-blue light strength level derived from content analysis of the input frame.

According to a first aspect of the present invention, an exemplary image processing method is disclosed. The exemplary image processing method includes: performing content analysis upon an input frame to generate at least one content analysis result of the input frame; determining, by a processing circuit, an anti-blue light strength level for the input frame according to the at least one content analysis result of the input frame; and in response to the anti-blue light strength level determined for the input frame, performing color correction upon the input frame to generate an output frame.

According to a second aspect of the present invention, an exemplary non-transitory machine-readable medium is disclosed. A program code is stored in the non-transitory machine-readable medium. When loaded and executed by a processing circuit, the program code instructs the processing circuit to perform following steps: controlling content analysis of an input frame for obtaining at least one content analysis result of the input frame; determining an anti-blue light strength level for the input frame according to the at least one content analysis result of the input frame; and in response to the anti-blue light strength level determined for the input frame, performing color correction upon the input frame to generate an output frame.

According to a third aspect of the present invention, an exemplary image processing apparatus is disclosed. The exemplary image processing apparatus includes a content analysis circuit, a processing circuit, and a color correction circuit. The content analysis circuit is arranged to perform content analysis upon an input frame to generate at least one content analysis result of the input frame. The processing circuit is coupled to the content analysis circuit, and arranged to determine an anti-blue light strength level for the input frame according to the at least one content analysis result of the input frame. The color correction circuit is coupled to the processing circuit, and arranged to generate an output frame by performing color correction upon the input frame in response to the anti-blue light strength level determined for the input frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
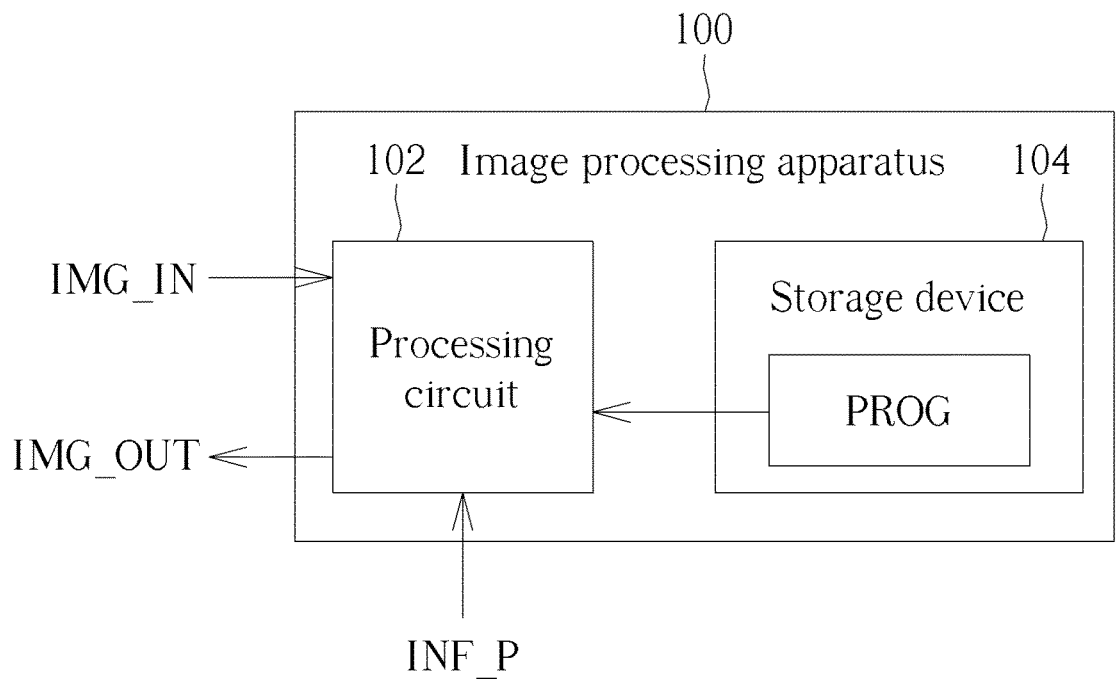
FIG. 1 is a diagram illustrating an image processing apparatus according to an embodiment of the present invention.

FIG. 1 is a diagram illustrating an image processing apparatus according to an embodiment of the present invention. The image processing apparatus 100 includes a processing circuit 102 and a storage device 104. In this embodiment, the processing circuit 102 may be implemented by a processor, a microcontroller unit, or any element with the software execution capability; and the storage device 104 is a machine-readable medium, and may be a volatile memory, a non-volatile memory, or any element with the code storage capability. As shown in FIG. 1, a program code PROG is stored in the storage device 104. When the program code PROG is loaded and executed by the processing circuit 102, the program code PROG instructs the processing circuit 102 to perform the proposed intelligent anti-blue light function. In other words, the proposed intelligent anti-blue light function may be implemented by software.

Figure 2:
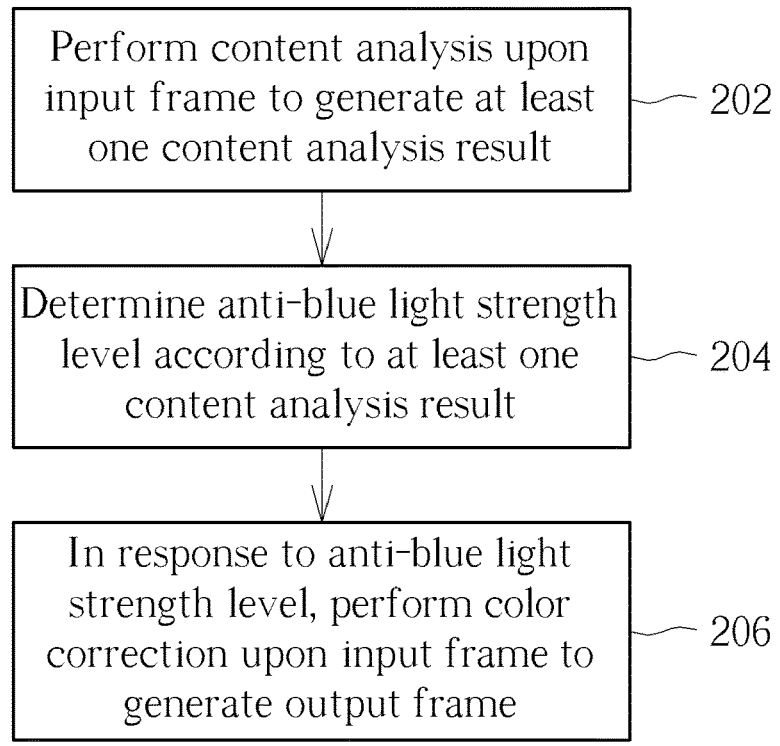
FIG. 2 is a flowchart illustrating an image processing method according to an embodiment of the present invention.

Please refer to FIG. 1 in conjunction with FIG. 2. FIG. 2 is a flowchart illustrating an image processing method according to an embodiment of the present invention. The image processing method may be employed by the image processing apparatus 100 for achieving blue light filtering. At step 202, the processing circuit 102 (particularly, the program code PROG running on the processing circuit 102) performs content analysis upon an input frame IMG_IN to generate at least one content analysis result of the input frame IMG_IN, or controls content analysis of the input frame IMG_IN for obtaining at least one content analysis result of the input frame IMG_IN. At step 204, the processing circuit 102 (particularly, the program code PROG running on the processing circuit 102) determines an anti-blue light strength level for the input frame IMG_IN according to content analysis result(s) of the input frame IMG_IN. At step 206, the processing circuit 102 (particularly, the program code PROG running on the processing circuit 102) performs color correction upon the input frame IMG_IN to generate an output frame IMG_OUT in response to the anti-blue light strength level determined for the input frame IMG_IN.

When performing step 202, the processing circuit 102 (particularly, the program code PROG running on the processing circuit 102) acts as at least a portion (i.e., part or all) of a content analyzer. By way of example, but not limitation, content analysis result(s) obtained at step 202 may include a histogram of the input frame IMG_IN, a bluish objection detection result of the input frame IMG_IN, an optical spectrum of the input frame IMG_IN, blue-light related information obtained by applying artificial intelligence (AI) based image processing (e.g., deep learning based image processing or machine learning based image processing) to the input frame IMG_IN, or a combination thereof.

Figure 3:
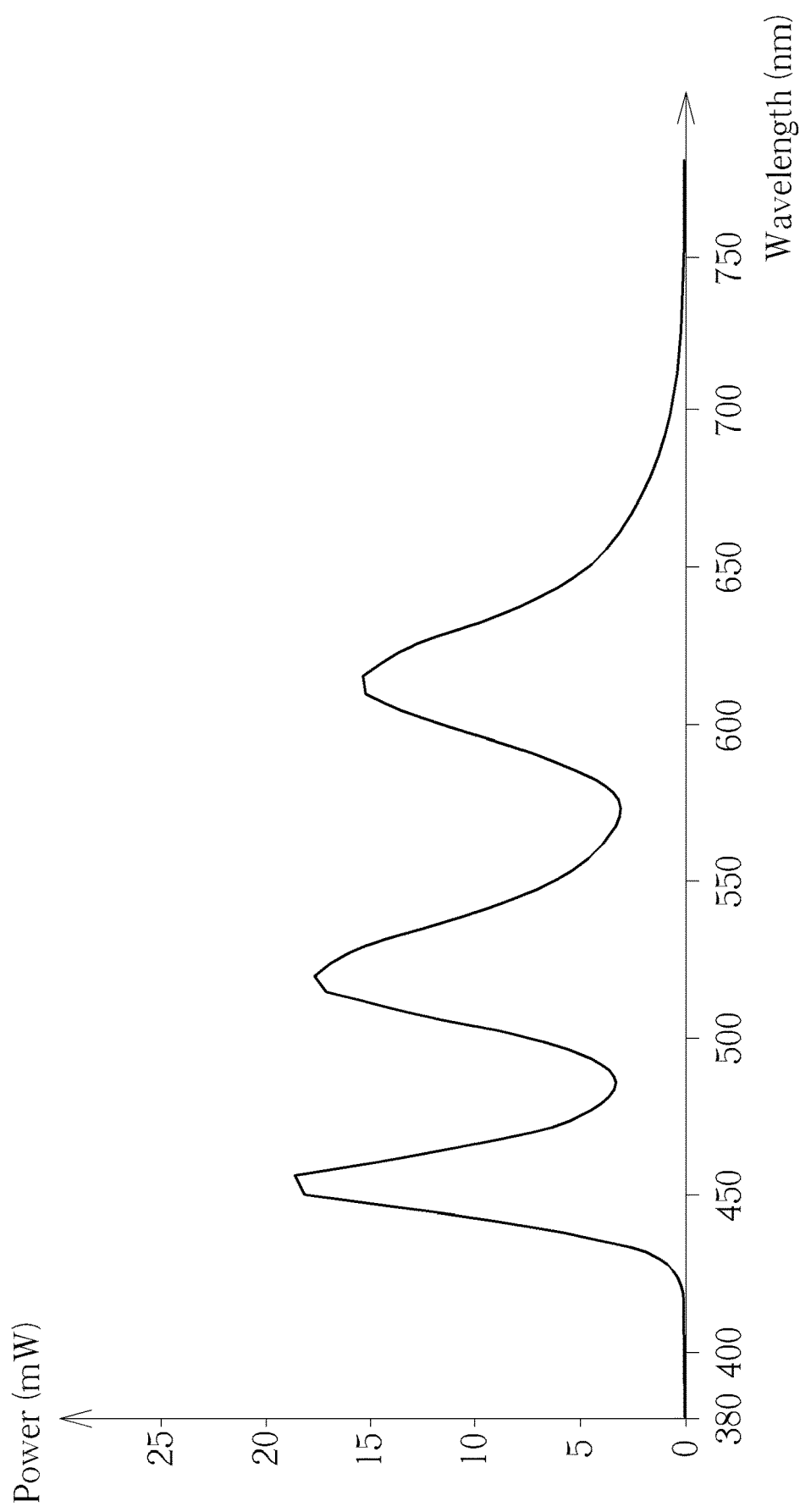
FIG. 3 is a diagram illustrating an example of an optical spectrum of an input frame that is obtained by the content analysis.

FIG. 3 is a diagram illustrating an example of an optical spectrum of the input frame IMG_IN that is obtained by the content analysis. The processing circuit 102 (particularly, the program code PROG running on the processing circuit 102) may control content analysis of the input frame IMG_IN for obtaining the optical spectrum of the pre-displayed input frame IMG_IN. For example, the image processing apparatus 100 is coupled to measurement equipment used for measuring the spectrum, where the measurement equipment may be a spectrometer, an integrating sphere, or a chroma meter. Hence, the processing circuit 102 (particularly, the program code PROG running on the processing circuit 102) can obtain the optical spectrum of the input frame IMG_IN from the measurement equipment after instructing the measurement equipment to do spectrum measurement for the pre-displayed input frame IMG_IN. In some embodiments of the present invention, the measurement equipment may be controlled by the processing circuit 102 (particularly, the program code PROG running on the processing circuit 102) to further measure a ratio of the harmful blue light spectrum to the whole light spectrum, a ratio of the harmful blue light spectrum to the blue light spectrum, and/or a ratio of the peak blue light spectrum to the peak non-blue light spectrum. The blue light spectrum related information given from the measurement equipment under the control of the processing circuit 102 (particularly, the program code PROG running on the processing circuit 102) can be referenced for determining intensity of the blue light hazard in the wavelength range 415 nm-455 nm.

Figure 4:
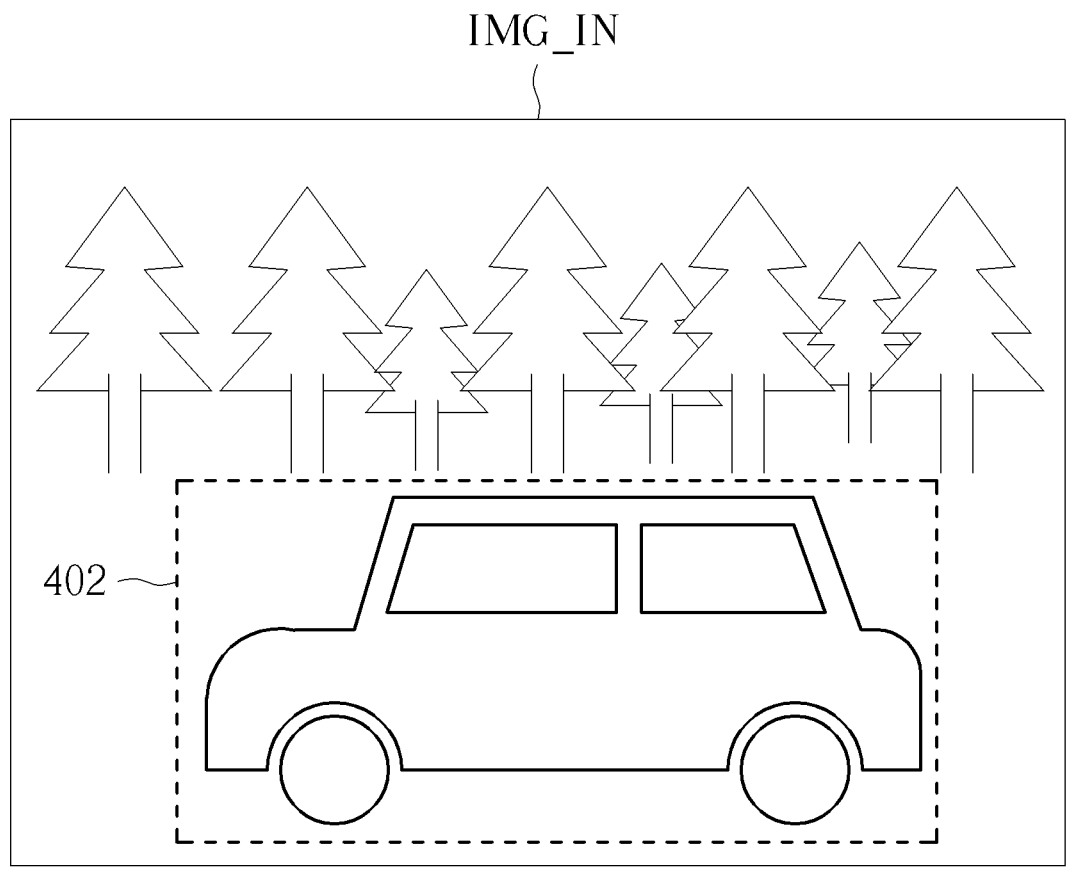
FIG. 4 is a diagram illustrating a bluish objection detection result of an input frame that is obtained by the content analysis.

FIG. 4 is a diagram illustrating a bluish objection detection result of the input frame IMG_IN that is obtained by the content analysis performed at the processing circuit 102 (particularly, the program code PROG running on the processing circuit 102). For example, a bluish object 402, such as a blue car, can be identified from the input fame IMG_IN, and may provide information that can be referenced for determining intensity of the blue light hazard in the wavelength range 415 nm-455 nm.

Figure 5:
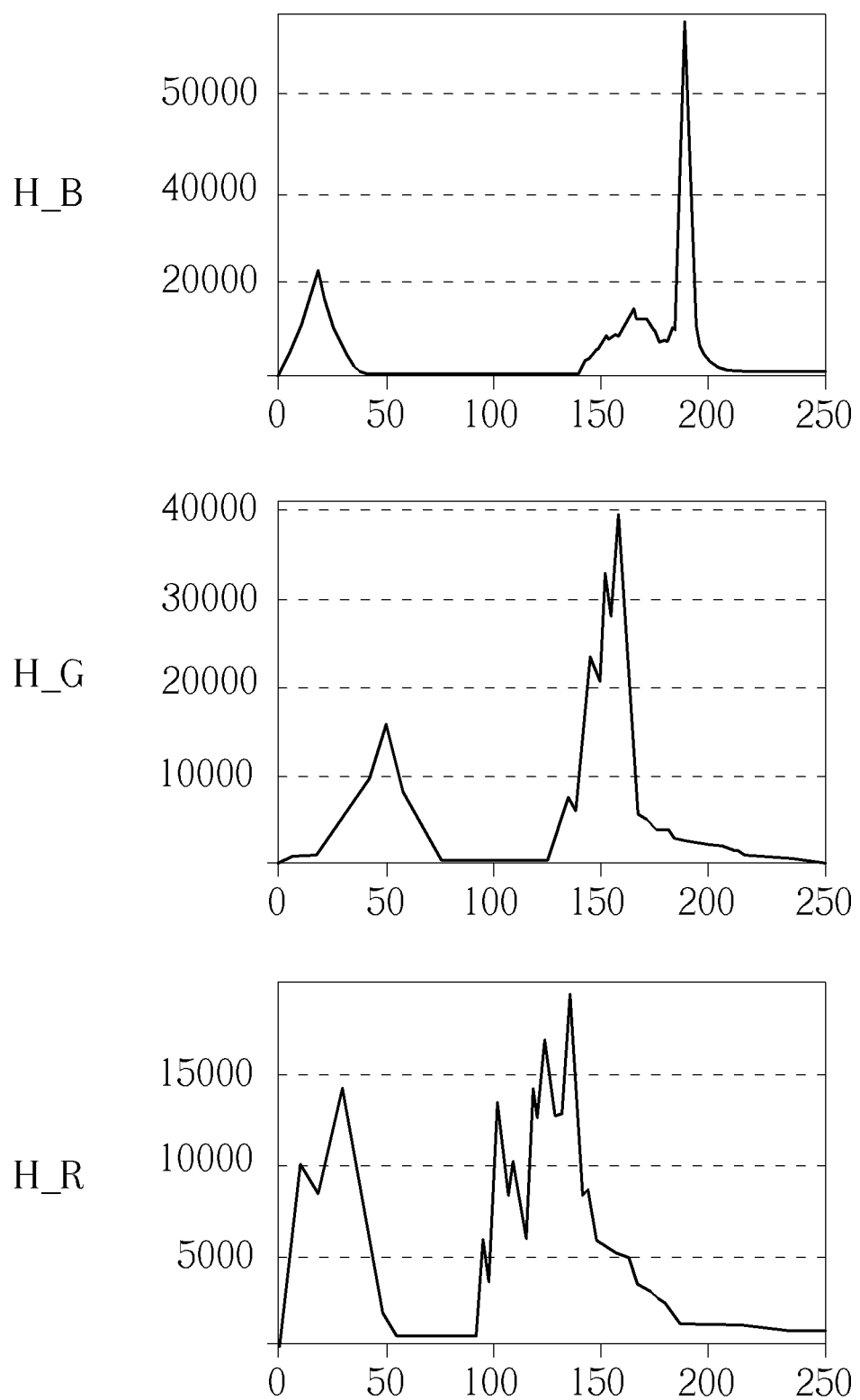
FIG. 5 is a diagram illustrating an example of a histogram of an input frame that is obtained by the content analysis.

FIG. 5 is a diagram illustrating an example of a histogram of the input frame IMG_IN that is obtained by the content analysis performed at the processing circuit 102 (particularly, the program code PROG running on the processing circuit 102). The histogram of the input frame IMG_IN consists of a blue-channel histogram H_B, a green-channel histogram H_G, and a red-channel histogram H_R, and the blue-channel histogram H_B may provide information that can be referenced for determining intensity of the blue light hazard in the wavelength range 415 nm-455 nm.

Figure 6:
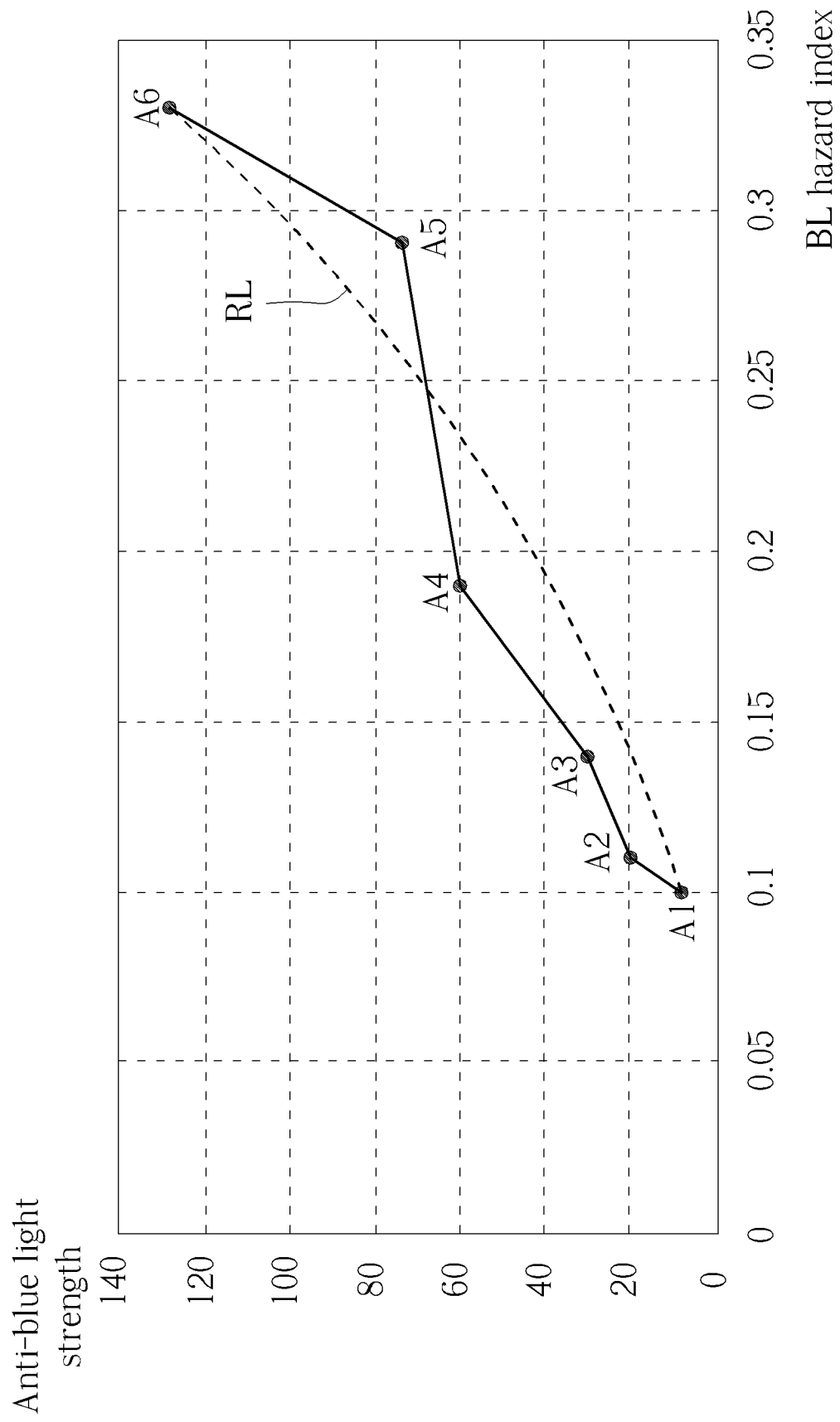
FIG. 6 is a diagram illustrating a regression line used by an anti-blue light strength decider according to an embodiment of the present invention.

When performing step 204, the processing circuit 102 (particularly, the program code PROG running on the processing circuit 102) acts as an anti-blue light strength decider. In this embodiment, the processing circuit 102 (particularly, the program code PROG running on the processing circuit 102) refers to content analysis result (s) and TÜV (Technischer Überwachungsverein) certification to determine a blue light hazard index of the input frame IMG_IN, and then decides an anti-blue light strength level for the input frame IMG_IN according to the blue light hazard index and a mapping function. For example, the mapping function may be represented by a regression line that is obtained from experiments on a display panel. FIG. 6 is a diagram illustrating a regression line RL used by an anti-blue light strength decider according to an embodiment of the present invention. The regression line RL defines mapping between blue light (BL) hazard indices and anti-blue light strength levels. With regard to generation of the regression line RL, lots of images are measured to find TÜV certificated indices (i.e., blue light hazard indices in compliance with the TÜV certification), and anti-blue light strength levels are fine tuned by trial and error and experiment on the display panel to avoid/mitigate the color shift. The TÜV certificated indices and associated fine-tuned anti-blue light strength levels may be recorded and represented by points A1, A2, A3, A4, A5, and A6 illustrated in FIG. 6. After the points A1-A6 are available, the regression line RL later used by the anti-blue light strength decider can be obtained by regression. For example, the regression line RL may be defined by a polynomial function Y=f(X), where Y represents an anti-blue light strength level, and X represents a blue light hazard index. As shown in FIG. 6, the regression line RL is a curve, but the present invention is not limited thereto.

Figure 7:
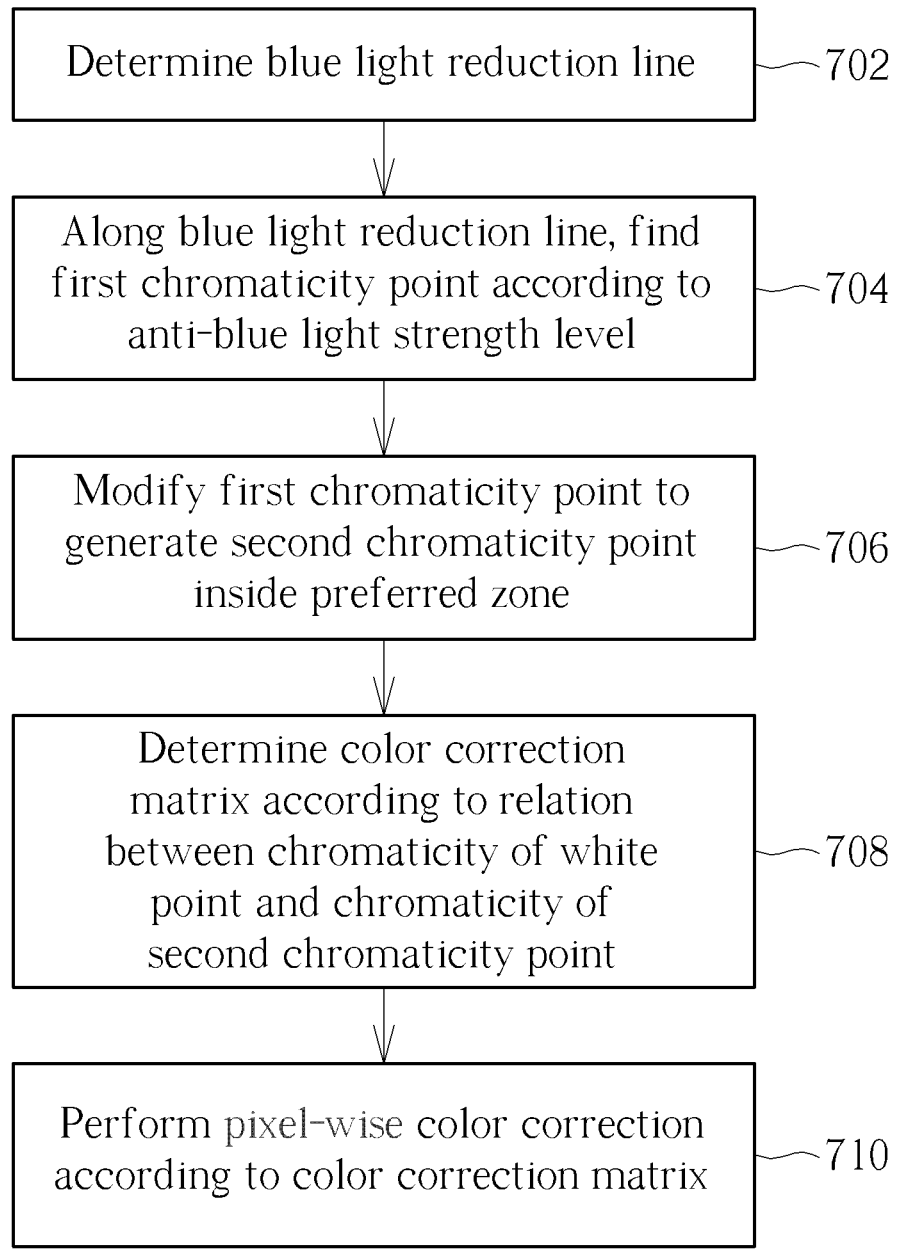
FIG. 7 is a flowchart illustrating details of the step 206 shown in FIG. 2 according to an embodiment of the present invention.
Figure 8:
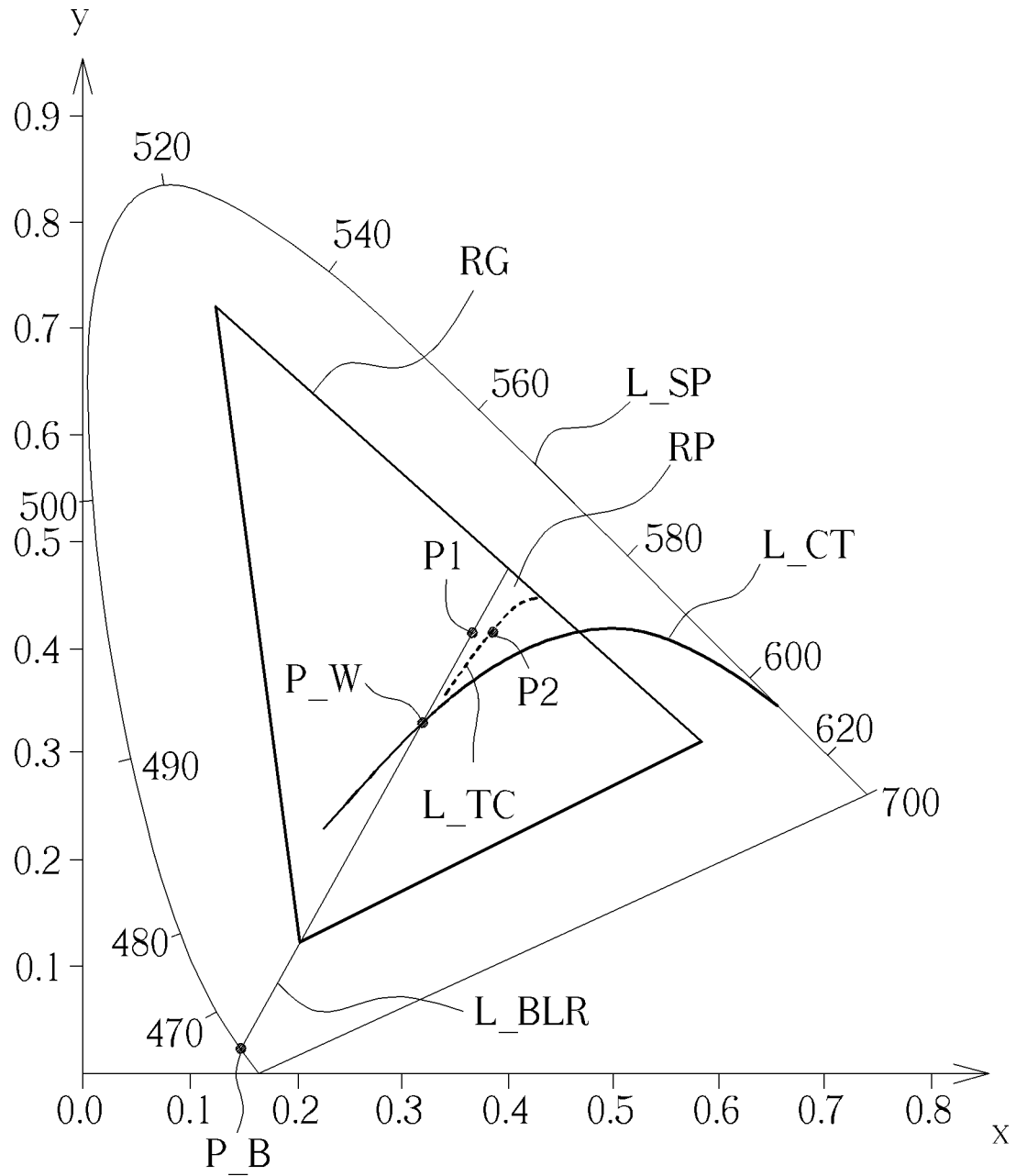
FIG. 8 is a diagram illustrating a blue light reduction line, a modified target chromaticity locus, a preferred zone, and a color temperature line (blackbody radiation color temperature line) on a chromaticity diagram according to an embodiment of the present invention.

When performing step 206, the processing circuit 102 (particularly, the program code PROG running on the processing circuit 102) acts as a blue-light filter that adaptively controls blue-light level per frame. Please refer to FIG. 7 in conjunction with FIG. 8. FIG. 7 is a flowchart illustrating details of the step 206 shown in FIG. 2 according to an embodiment of the present invention. FIG. 8 is a diagram illustrating a blue light reduction line, a modified target chromaticity locus, a preferred zone, and a color temperature line (blackbody radiation color temperature line) on a chromaticity diagram according to an embodiment of the present invention. In this embodiment, step 206 may be regarded as having steps 702-710. Hence, the processing circuit 102 (particularly, the program code PROG running on the processing circuit 102) performs steps 702-710 to apply color correction to the input frame IMG_IN for reducing the blue light hazard.

At step 702, the processing circuit 102 (particularly, the program code PROG running on the processing circuit 102) determines a blue light reduction line L_BLR. As known to those skilled in the pertinent art, the curved edge of the gamut of human vision is called the spectral locus L_SP and corresponds to monochromatic light (each point representing a pure hue of a single wavelength), with wavelengths listed in nanometers. In this embodiment, the blue light reduction line L_BLR is defined by a straight line passing through a white point P_W of the display panel and a blue light hazard boundary point P_B on the spectral locus L_SP. By way of example, but not limitation, the blue light hazard boundary point P_B may have the wavelength of around 435 nm. In this embodiment, the processing circuit 102 shown in FIG. 1 may further receive panel information INF_P that carries parameters of the display panel such as panel gamma and three vertex point values. In accordance with the panel information INF_P, the processing circuit 102 (particularly, the program code PROG running on the processing circuit 102) knows the gamut of the display panel (which is represented by the triangular area RG in FIG. 8) as well as the white point W_P of the display panel. For example, the white point P_W may have the chromaticity (x, y)=(0.3127, 0.3290). At step 704, along the blue light reduction line L_BLR, the processing circuit 102 (particularly, the program code PROG running on the processing circuit 102) finds a first chromaticity point P1 according to the anti-blue light strength level obtained at step 204. At step 706, the processing circuit 102 (particularly, the program code PROG running on the processing circuit 102) modifies the first chromaticity point P1 to generate a second chromaticity point P2 inside a preferred zone RP, to avoid/mitigate the color shift. As shown in FIG. 8, the preferred zone RP is between the blue light reduction line L_BLR and the color temperature line (or called blackbody radiation color temperature line) L_CT. More particularly, the preferred zone RP is delimited by the blue light reduction line L_BLR, the color temperature line L_CT, and the boundary of the gamut of the display panel. In this embodiment, second chromaticity points P2 found for different anti-blue light strength levels (which are indicative of non-zero blue light filtering) are ensured to be on a modified target chromaticity locus L_TC inside the preferred zone RP, where the modified target chromaticity locus L_TC may be determined by experiments.

In one exemplary design, an initial color coordinate (x, y)=(x1, y1) on the chromaticity diagram is determined by finding the first chromaticity point P1 along the blue light reduction line L_BLR, and a final color coordinate (x, y)=(x2, y2) on the chromaticity diagram is determined by directly referring to the first chromaticity point P1 to find the second chromaticity point P2 on the modified target chromaticity locus L_TC. That is, the first chromaticity point P1 may be directly mapped to the second chromaticity point P2 without further adjustment.

In another exemplary design, the first chromaticity point P1 is used to determine the second chromaticity point P2 after undergoing certain modifications. For example, an initial color coordinate (x, y)=(x1, y1) on the chromaticity diagram is determined by finding the first chromaticity point P1 along the blue light reduction line L_BLR, a first modified color coordinate (x, y)=(x3, y3) on the chromaticity diagram is obtained by modifying the initial color coordinate (x, y)=(x1, y1) according to the image color temperature of the input frame IMG_IN, a second modified color coordinate (x, y)=(x4, y4) on the chromaticity diagram is obtained by modifying the first color coordinate (x, y)=(x3, y3) according to a tuning offset that depends on the user preference, and a final color coordinate (x, y)=(x2, y2) on the chromaticity diagram is determined by referring to the second modified color coordinate (x, y)=(x4, y4) to find the second chromaticity point P2 on the modified target chromaticity locus L_TC.

It should be noted that the above is for illustrative purposes only, and is not meant to be a limitation of the present invention. In practice, any algorithm-based blue light filtering design that derives the second chromaticity point P2 on the modified target chromaticity locus L_TC (which is confined to the preferred zone RP) from the first chromaticity point P1 on the blue light reduction line L_BLR falls within the scope of the present invention.

At step 708, the processing circuit 102 (particularly, the program code PROG running on the processing circuit 102) determines a color correction matrix according to the relation between chromaticity of the white point P_W (i.e., color coordinate of the white point P_W on the chromaticity diagram) and chromaticity of the second chromaticity point P2 (i.e., color coordinate of the second chromaticity point P2 on the chromaticity diagram). For example, the relation between chromaticity $(x, y)_{P\_W}$ of the white point P_W and chromaticity $(x, y)_{P2}$ of the second chromaticity point P2 chromaticity (P2) is described by the color correction matrix $M_{corr}$, that is, $(x, y)_{P2} = M_{corr} * (x, y)_{P\_W}$.

At step 710, the processing circuit 102 (particularly, the program code PROG running on the processing circuit 102) performs pixel-wise color correction upon the input frame IMG_IN according to the color correction matrix, to generate the output frame IMG_OUT. For example, a color-corrected frame with reduced blue light hazard is generated and output as the output frame IMG_OUT that will be displayed on the display panel.

In the aforementioned embodiments, the proposed intelligent anti-blue light function is implemented by software. However, this is for illustrative purposes only, and is not meant to be a limitation of the present invention. Alternatively, the proposed intelligent anti-blue light function may be implemented by pure hardware.

Figure 9:
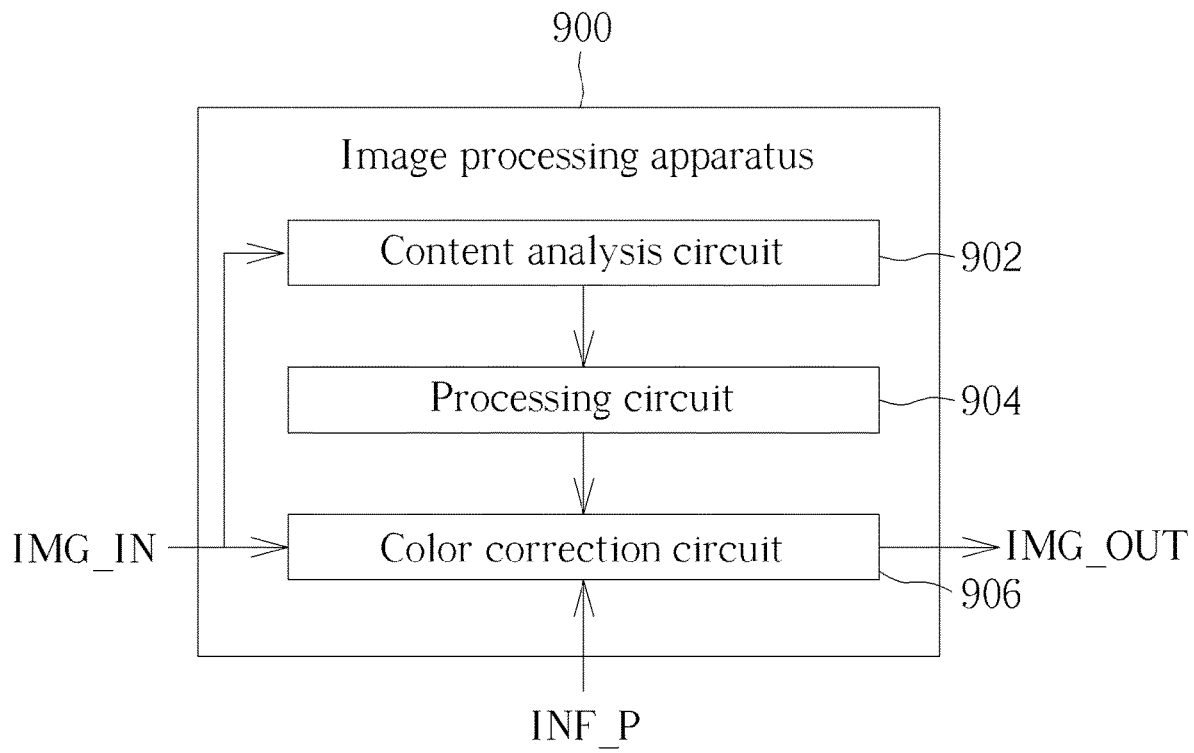
FIG. 9 is a diagram illustrating another image processing apparatus according to an embodiment of the present invention.

FIG. 9 is a diagram illustrating another image processing apparatus according to an embodiment of the present invention. The image processing apparatus 900 includes a content analysis circuit 902, a processing circuit 904, and a color correction circuit 906. The content analysis circuit 902 may be dedicated hardware arranged to deal with operations specified in step 202. For example, the content analysis circuit 902 may include spectrum measurement equipment (e.g., a spectrometer, an integrating sphere, or a chroma meter), a bluish object detection circuit, and/or a histogram computation circuit. The processing circuit 904 may be dedicated hardware arranged to deal with operations specified in step 204. The color correction circuit 906 may be dedicated hardware arranged to deal with operations specified in step 206 and steps 702-710. As a person skilled in the art can readily understand details of the image processing apparatus 900 after reading above paragraphs, further description is omitted here for brevity.

Figure 10:
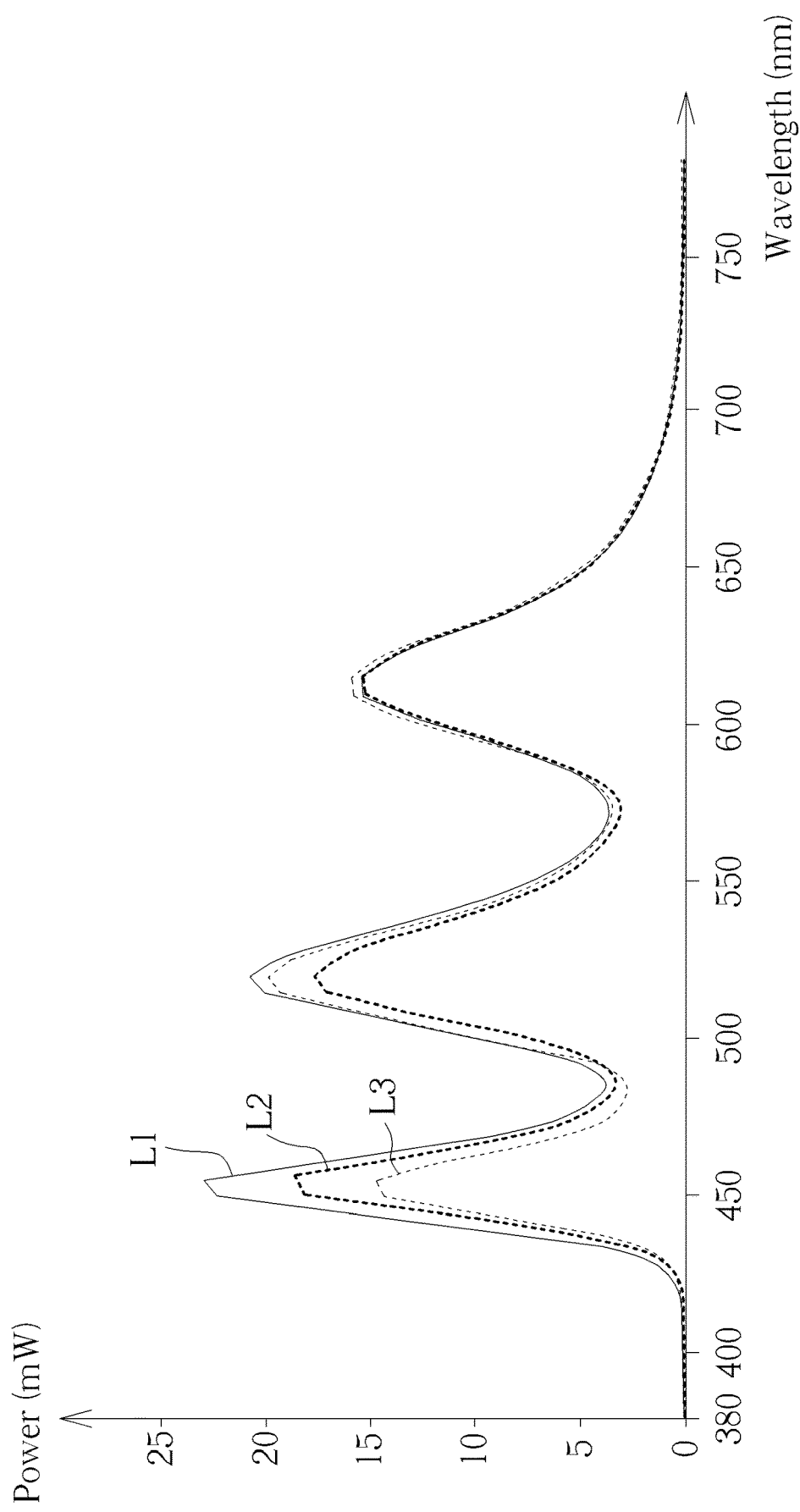
FIG. 10 is a diagram illustrating performance comparison between a proposed blue light filtering design using a modified target chromaticity locus for color correction and a blue light filtering design using a color temperature line (blackbody radiation color temperature line) for color correction.

FIG. 10 is a diagram illustrating performance comparison between a proposed blue light filtering design using the modified target chromaticity locus L_TC for color correction and a blue light filtering design using the color temperature line (blackbody radiation color temperature line) L_CT for color correction. The characteristic curve L1 shows the original optical spectrum of the input frame IMG_IN with no blue light filtering. The characteristic curve L2 shows the optical spectrum of the output frame IMG_OUT generated from the blue light filtering design using the color temperature line (blackbody radiation color temperature line) L_CT for color correction. The characteristic curve L3 shows the optical spectrum of the output frame IMG_OUT generated from the proposed blue light filtering design using the modified target chromaticity locus L_TC for color correction. As mentioned above, the embodiment of the present invention makes the second chromaticity point P2 confined to the preferred zone RP that is between the blue light reduction line L_BLR and the color temperature line (blackbody radiation color temperature line) L_CT. Compared to the blue light filtering design using the color temperature line (blackbody radiation color temperature line) L_CT for color correction, the proposed blue light filtering design using the modified target chromaticity locus L_TC for color correction may have lower brightness loss and can pass the TÜV certification.

Briefly summarized, the proposed blue light filtering design can address the blue light hazard issue with low color loss, low correlated-color-temperature variation, low brightness loss, satisfied color gamut range, and/or no extra cost of panel film/filter. Furthermore, the proposed blue light filtering design uses content analysis to adaptively control blue-light level per frame. Hence, the image processing apparatus 100/900 may apply color correction with different anti-blue light strength levels (i.e., content-aware blue light filtering) to a plurality of input frames, respectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method comprising:
   performing content analysis upon an input frame to generate at least one content analysis result of the input frame;
   determining, by a processing circuit, an anti-blue light strength level for the input frame according to said at least one content analysis result of the input frame; and
   in response to the anti-blue light strength level determined for the input frame, performing color correction upon the input frame to generate an output frame, comprising:
      determining a blue light reduction line that passes through a white point and a blue light hazard boundary point on a spectral locus;
      along the blue light reduction line, finding a first chromaticity point according to the anti-blue light strength level determined for the input frame; and
      determining a color correction matrix employed by said color correction according to the first chromaticity point.

2. The image processing method of claim 1, wherein said at least one content analysis result comprises a histogram of the input frame.

3. The image processing method of claim 1, wherein said at least one content analysis result comprises a bluish objection detection result of the input frame.

4. The image processing method of claim 1, wherein said at least one content analysis result comprises an optical spectrum of the input frame.

5. The image processing method of claim 1, wherein said at least one content analysis result comprises blue-light related information obtained by applying artificial intelligence (AI) based image processing to the input frame.

6. The image processing method of claim 1, wherein determining the color correction matrix employed by said color correction according to the first chromaticity point comprises:
   modifying the first chromaticity point to generate a second chromaticity point inside a preferred zone, wherein the preferred zone is between the blue light reduction line and a color temperature line; and
   determining the color correction matrix according to relation between chromaticity of the white point and chromaticity of the second chromaticity point.

7. The image processing method of claim 1, wherein the input frame is one of a plurality of input frames, and the image processing method applies color correction with different anti-blue light strength levels to the plurality of input frames, respectively.

8. A non-transitory machine-readable medium for storing a program code, wherein when loaded and executed by a processing circuit, the program code instructs the processing circuit to perform following steps:
   controlling content analysis of an input frame for obtaining at least one content analysis result of the input frame;
   determining an anti-blue light strength level for the input frame according to said at least one content analysis result of the input frame; and
   in response to the anti-blue light strength level determined for the input frame, performing color correction upon the input frame to generate an output frame, comprising:
      determining a blue light reduction line that passes through a white point and a blue light hazard boundary point on a spectral locus;
      along the blue light reduction line, finding a first chromaticity point according to the anti-blue light strength level determined for the input frame; and
      determining a color correction matrix employed by said color correction according to the first chromaticity point.

9. The non-transitory machine-readable medium of claim 8, wherein said at least one content analysis result comprises a histogram of the input frame.

10. The non-transitory machine-readable medium of claim 8, wherein said at least one content analysis result comprises a bluish objection detection result of the input frame.

11. The non-transitory machine-readable medium of claim 8, wherein said at least one content analysis result comprises an optical spectrum of the input frame.

12. The non-transitory machine-readable medium of claim 8, wherein said at least one content analysis result comprises blue-light related information obtained by applying artificial intelligence (AI) based image processing to the input frame.

13. The non-transitory machine-readable medium of claim 8, wherein determining the color correction matrix employed by said color correction according to the first chromaticity point comprises:
    modifying the first chromaticity point to generate a second chromaticity point inside a preferred zone, wherein the preferred zone is between the blue light reduction line and a color temperature line; and
    determining the color correction matrix according to relation between chromaticity of the white point and chromaticity of the second chromaticity point.

14. The non-transitory machine-readable medium of claim 8, wherein the input frame is one of a plurality of input frames, and the program code instructs the processing circuit to apply color correction with different anti-blue light strength levels to the plurality of input frames, respectively.

15. An image processing apparatus comprising:
    a content analysis circuit, arranged to perform content analysis upon an input frame to generate at least one content analysis result of the input frame;
    a processing circuit, coupled to the content analysis circuit, and arranged to determine an anti-blue light strength level for the input frame according to said at least one content analysis result of the input frame; and
    a color correction circuit, coupled to the processing circuit, and arranged to generate an output frame by performing color correction upon the input frame in response to the anti-blue light strength level determined for the input frame, wherein the color correction circuit is further arranged to determine a blue light reduction line that passes through a white point and a blue light hazard boundary point on a spectral locus; along the blue light reduction line, find a first chromaticity point according to the anti-blue light strength level determined for the input frame; and determine a color correction matrix employed by said color correction according to the first chromaticity point.

16. The image processing apparatus of claim 15, wherein said at least one content analysis result comprises a histogram of the input frame.

17. The image processing apparatus of claim 15, wherein said at least one content analysis result comprises a bluish objection detection result of the input frame.

18. The image processing apparatus of claim 15, wherein said at least one content analysis result comprises an optical spectrum of the input frame.

19. The image processing apparatus of claim 15, wherein said at least one content analysis result comprises blue-light related information obtained by applying artificial intelligence (AI) based image processing to the input frame.

20. The image processing apparatus of claim 15, wherein the color correction circuit is further arranged to modify the first chromaticity point to generate a second chromaticity point inside a preferred zone, and determine the color correction matrix according to relation between chromaticity of the white point and chromaticity of the second chromaticity point, wherein the preferred zone is between the blue light reduction line and a color temperature line.

21. The image processing apparatus of claim 15, wherein the input frame is one of a plurality of input frames, and the processing circuit applies color correction with different anti-blue light strength levels to the plurality of input frames, respectively.

* * * * *